(12) United States Patent
Cuthbertson

(10) Patent No.: US 10,762,239 B2
(45) Date of Patent: **\*Sep. 1, 2020**

(54) APPARATUS AND METHOD FOR DATA MATCHING AND ANONYMIZATION

(71) Applicant: Datalogix Holdings, Inc., Redwood Shores, CA (US)

(72) Inventor: Robert John Cuthbertson, Lafayette, CO (US)

(73) Assignee: Datalogix Holdings, Inc., Redwood Shores, CA (US)

( \* ) Notice: Subject to any disclaimer, the term of this patent is extended or adjusted under 35 U.S.C. 154(b) by 53 days.

This patent is subject to a terminal disclaimer.

(21) Appl. No.: 15/940,557

(22) Filed: Mar. 29, 2018

(65) Prior Publication Data

US 2018/0218174 A1 Aug. 2, 2018

Related U.S. Application Data

(60) Division of application No. 14/642,041, filed on Mar. 9, 2015, now Pat. No. 9,934,409, which is a
(Continued)

(51) Int. Cl.
*G06F 21/62* (2013.01)
*H04L 29/06* (2006.01)
(Continued)

(52) U.S. Cl.
CPC ........ *G06F 21/6254* (2013.01); *G06F 21/602* (2013.01); *H04L 9/0894* (2013.01);
(Continued)

(58) Field of Classification Search
CPC ... G06F 21/254; G06F 21/602; H04L 9/0894; H04L 63/0407; H04L 67/22; H04L 67/306; H04L 2209/42
See application file for complete search history.

(56) References Cited

U.S. PATENT DOCUMENTS 5,436,972 A 7/1995 Fischer
5,850,451 A 12/1998 Sudia
(Continued)

FOREIGN PATENT DOCUMENTS

CN 103562851 A 2/2014
WO 01/46826 A1 6/2001
(Continued)

OTHER PUBLICATIONS

Search Query Report from IP.com (performed Apr. 20, 2020).\*
(Continued)

*Primary Examiner* — Sharon S Lynch
(74) *Attorney, Agent, or Firm* — Invoke

(57) ABSTRACT

A method includes receiving a plurality of data sets. Each data set includes a customer identifier field specifying a unique customer identifier associated with each entry in each data set. The plurality of data sets includes a first group of data sets and a second group of data sets. The method further includes storing the plurality of data sets, and generating a key map including the customer identifier field including unique customer identifiers of the first group of data sets of the plurality of data sets, and an anonymous identifier field including unique anonymous identifiers. Each anonymous identifier corresponds to a customer identifier of the key map. The method further includes replacing each unique customer identifier in the second group of data sets with the corresponding anonymous identifier.

15 Claims, 4 Drawing Sheets

Related U.S. Application Data continuation of application No. 14/449,831, filed on Aug. 1, 2014, now Pat. No. 8,978,153.

(51) Int. Cl.
*H04L 9/08* (2006.01)
*G06F 21/60* (2013.01)
*H04L 29/08* (2006.01)

(52) U.S. Cl.
CPC .......... *H04L 63/0407* (2013.01); *H04L 67/22* (2013.01); *H04L 67/306* (2013.01); *H04L 2209/42* (2013.01)

(56) References Cited

U.S. PATENT DOCUMENTS

| | | | |
|---|---|---|---|
| 6,026,163 A | 2/2000 | Micali | |
| 6,141,423 A | 10/2000 | Fischer | |
| 6,216,229 B1 | 4/2001 | Fischer | |
| 6,449,621 B1* | 9/2002 | Pettovello | G06F 21/6254 |
| 6,496,931 B1 | 12/2002 | Rajchel et al. | |
| 6,734,886 B1 | 5/2004 | Hagan et al. | |
| 6,938,022 B1* | 8/2005 | Singhal | G06F 21/6254 |
| | | | 705/74 |
| 6,959,281 B1 | 10/2005 | Freeling et al. | |
| 7,181,017 B1* | 2/2007 | Nagel | H04L 9/0825 |
| | | | 380/282 |
| 7,243,304 B2 | 7/2007 | Sato | |
| 7,324,648 B1 | 1/2008 | Deaver et al. | |
| 7,418,485 B2 | 8/2008 | Payrits | |
| 7,472,091 B2 | 12/2008 | Gailey et al. | |
| 7,747,873 B2 | 6/2010 | Rabin et al. | |
| 7,882,134 B2 | 2/2011 | Pattabhi et al. | |
| 7,996,912 B2 | 8/2011 | Spalink et al. | |
| 8,051,472 B2 | 11/2011 | Maes | |
| 8,140,502 B2 | 3/2012 | Francis et al. | |
| 8,307,006 B2 | 11/2012 | Hannan et al. | |
| 8,316,237 B1* | 11/2012 | Felsher | H04L 9/0825 |
| | | | 380/282 |
| 8,413,261 B2 | 4/2013 | Nemoy et al. | |
| 8,452,619 B2 | 5/2013 | Kenedy et al. | |
| 8,560,456 B2 | 10/2013 | Williams | |
| 8,561,094 B2 | 10/2013 | Chen | |
| 8,577,933 B2 | 11/2013 | Evenhaim | |
| 8,639,920 B2 | 1/2014 | Stack et al. | |
| 8,661,247 B2* | 2/2014 | Spalka | G06F 21/6254 |
| | | | 380/44 |
| 8,799,055 B2 | 8/2014 | Hahn et al. | |
| 8,904,181 B1* | 12/2014 | Felsher | H04L 9/0825 |
| | | | 380/282 |
| 8,978,153 B1 | 3/2015 | Cuthbertson | |
| 9,338,008 B1 | 5/2016 | Kirkland et al. | |
| 9,355,273 B2* | 5/2016 | Stevens | G06F 21/6254 |
| 2007/0130465 A1* | 6/2007 | Zeng | G06F 21/31 |
| | | | 713/171 |
| 2007/0282681 A1 | 12/2007 | Shubert et al. | |
| 2008/0147554 A1* | 6/2008 | Stevens | G06F 21/6254 |
| | | | 705/51 |
| 2008/0181414 A1 | 7/2008 | Deaver et al. | |
| 2008/0214310 A1 | 9/2008 | Brunet et al. | |
| 2008/0255944 A1* | 10/2008 | Shah | G06Q 30/02 |
| | | | 705/14.47 |
| 2010/0088715 A1 | 4/2010 | Sloo | |
| 2010/0094758 A1 | 4/2010 | Chamberlain et al. | |
| 2010/0199098 A1 | 8/2010 | King | |
| 2010/0241595 A1* | 9/2010 | Felsher | G06Q 30/0283 |
| | | | 705/400 |
| 2010/0313009 A1 | 12/2010 | Combet et al. | |
| 2011/0246776 A1 | 10/2011 | Deaver et al. | |
| 2011/0296440 A1 | 12/2011 | Laurich et al. | |
| 2012/0150641 A1 | 6/2012 | Dobbs et al. | |
| 2012/0210120 A1 | 8/2012 | Irvine | |
| 2012/0266250 A1 | 10/2012 | Uhl | |
| 2012/0303616 A1 | 11/2012 | Abuelsaad et al. | |
| 2012/0311035 A1* | 12/2012 | Guha | G06Q 30/08 |
| | | | 709/204 |
| 2012/0311339 A1 | 12/2012 | Irvine | |
| 2013/0006766 A1 | 1/2013 | Dedeoglu et al. | |
| 2013/0061049 A1 | 3/2013 | Irvine | |
| 2013/0117170 A1 | 5/2013 | Coppinger | |
| 2013/0138698 A1* | 5/2013 | Harada | G06F 21/6263 |
| | | | 707/797 |
| 2013/0159021 A1* | 6/2013 | Felsher | G06F 21/6245 |
| | | | 705/3 |
| 2014/0019467 A1 | 1/2014 | Itoh et al. | |
| 2014/0032265 A1 | 1/2014 | Paprocki | |
| 2014/0040172 A1* | 2/2014 | Ling | G06N 5/022 |
| | | | 706/12 |
| 2014/0222684 A1* | 8/2014 | Felsher | G06Q 30/0283 |
| | | | 705/50 |
| 2015/0118994 A1 | 4/2015 | Shin et al. | |
| 2016/0055244 A1* | 2/2016 | Wang | G06F 16/9535 |
| | | | 707/770 |
| 2016/0254913 A1 | 9/2016 | Kirkland et al. | |

FOREIGN PATENT DOCUMENTS

| | | |
|---|---|---|
| WO | 2005/098736 A2 | 10/2005 |
| WO | 2016/018466 A1 | 2/2016 |

OTHER PUBLICATIONS

HHS.gov, "Guidance Regarding Methods for De-identification of Protected Health Information in Accordance with the Health Insurance Portability and Accountability Act (HIPAA) Privacy Rule", Available online at <http://www.hhs.gov/ocr/privacy/hipaa/understanding/coveredentities/De-identification/hhs_deid_guidance.pdf>, Nov. 26, 2012, pp. 1-32.

"Stata FAQ: How Can I Anonymize Patient IDs and Still Be Able to Decode Them, If Necessary", Available online at <https://web.archive.org/web/20131225103910/http://www.ats.ucla.edu/stata/faq/fake_id.htm>, Dec. 25, 2013-Nov. 6, 2016, 2 pages.

\* cited by examiner

302 Receiving a reference data set including a customer identifier field, the customer identifier field of the reference data set specifying a unique customer identifier associated with each entry in the reference data set

304 Receiving a first data set including the customer identifier field, the customer identifier field for the first data set specifying a unique customer identifier associated with each entry in the first data set, the first data set associable with the reference data set based on the customer identifier field

306 Storing the reference data set and the first data set

308 Rendering the first data set unassociable with the reference data set by replacing each unique customer identifier of the second data set with a corresponding anonymous identifier based on a key map, the key map including the customer identifier field and an anonymous identifier field, the customer identifier field for the key map including the unique customer identifiers of the second data set, the anonymous identifier field including unique anonymous identifiers, each anonymous identifier corresponding to a customer identifier of the key map, each anonymous identifier different from its corresponding customer identifier

310 Receiving one or more additional data sets, each additional data set including the customer identifier field, the one or more additional data sets associable with the reference data set based on the customer identifier field and unassociable with the first data set

312 Rendering the one or more additional data sets as unassociable with the reference data set by replacing each unique customer identifier in each additional data set with its corresponding anonymous identifier, based on the key map, the rendering including rendering the one or more additional data sets as associable with the first data set based on the anonymous identifier field

400

Receiving a first data set including a customer identifier field, the customer identifier field specifying a unique customer identifier associated with each entry in the first data set
402

Storing the first data set
404

Replacing each unique customer identifier of the first data set with a corresponding anonymous identifier based on a key map, the key map including the customer identifier field and an anonymous identifier field, the customer identifier field for the key map including the unique customer identifiers of the first data set, the anonymous identifier field including unique anonymous identifiers, each anonymous identifier corresponding to a customer identifier of the key map, each anonymous identifier different from its corresponding customer identifier
406

Receiving one or more additional data sets, each additional data set including the customer identifier field, the one or more additional data sets unassociable with the first data set
408

Rendering the one or more additional data sets associable with the first data set based on the anonymous identifier by replacing each unique customer identifier in each additional data set with its corresponding anonymous identifier, based on the key map
410

FIG. 4

APPARATUS AND METHOD FOR DATA MATCHING AND ANONYMIZATION

CROSS-REFERENCES TO RELATED APPLICATIONS

The present application is a divisional of U.S. patent application Ser. No. 14/642,041, filed Mar. 9, 2015, entitled "APPARATUS AND METHOD FOR DATA MATCHING AND ANONYMIZATION", which is a continuation of U.S. patent application Ser. No. 14/449,831, filed Aug. 1, 2014, entitled "APPARATUS AND METHOD FOR DATA MATCHING AND ANONYMIZATION," the entire contents for each which are incorporated herein by reference for all purposes.

BACKGROUND

Some embodiments described herein relate generally to methods and apparatus for data matching and anonymization.

In digital media, information managed and exchanged between business entities is often a combination of confidential information, that cannot be shared (e.g., home address information of customers), and other business information that is to be shared (e.g., purchasing activity). When confidential and business information is inextricably linked by a common identifier, it is challenging to effectively isolate, anonymize, and/or otherwise reversibly and/or irreversibly dissociate the information to be transmitted vs. the information to be protectively retained.

A need exists, therefore, for methods and apparatus for data matching and anonymization using one or more key maps.

SUMMARY

In some embodiments, a method includes receiving a plurality of data sets. Each data set includes a customer identifier field that specifies a unique customer identifier associated with each entry in each data set. The plurality of data sets includes a first group of data sets and a second group of data sets, each data set associable with each other data set based on the customer identifier. The method further includes storing the plurality of data sets, and generating a key map including the customer identifier field and an anonymous identifier field. The customer identifier field for the key map includes unique customer identifiers of the first group of data sets of the plurality of data sets, and the anonymous identifier field includes unique anonymous identifiers. Each anonymous identifier corresponds to a customer identifier of the key map, each anonymous identifier different from its corresponding customer identifier. The method further includes storing the key map, and rendering each data set of the second group of data sets as unassociable with each data set of the first group of data sets by replacing, based on the key map, each unique customer identifier in the second group of data sets with the corresponding anonymous identifier. The method further includes rendering each data set of the second group of data sets associable with each other data set of the second group of data sets based on the anonymous identifier.

In some embodiments, a method includes receiving a reference data set including a customer identifier field. The customer identifier field of the reference data set specifies a unique customer identifier associated with each entry in the reference data set. The method further includes receiving a first data set including the customer identifier field. The customer identifier field for the first data set specifies a unique customer identifier associated with each entry in the first data set, the first data set associable with the reference data set based on the customer identifier field. The method further includes storing the reference data set and the first data set. The method further includes rendering the first data set unassociable with the reference data set by replacing each unique customer identifier of the second data set with a corresponding anonymous identifier based on a key map. The key map includes the customer identifier field and an anonymous identifier field, the customer identifier field for the key map including the unique customer identifiers of the second data set, the anonymous identifier field including unique anonymous identifiers, each anonymous identifier corresponding to a customer identifier of the key map, each anonymous identifier different from its corresponding customer identifier. The method further includes receiving one or more additional data sets, each additional data set including the customer identifier field. The one or more additional data sets is associable with the reference data set based on the customer identifier field and unassociable with the first data set. The method further includes rendering the one or more additional data sets as unassociable with the reference data set by replacing each unique customer identifier in each additional data set with its corresponding anonymous identifier, based on the key map. The rendering includes rendering the one or more additional data sets as associable with the first data set based on the anonymous identifier field.

In some embodiments, an apparatus includes a data module configured to receive a plurality of data sets, each data set including a customer identifier field. The customer identifier field specifies a unique customer identifier associated with each entry in each data set. The plurality of data sets includes a first group of data sets and a second group of data sets, each data set associable with each other data set based on the customer identifier. The data module is further configured to store the plurality of data sets. The apparatus further includes a key module configured to generate a key map including the customer identifier field and an anonymous identifier field. The customer identifier field for the key map includes unique customer identifiers of the first group of data sets of the plurality of data sets, and the anonymous identifier field includes unique anonymous identifiers. Each anonymous identifier corresponds to a customer identifier of the key map, each anonymous identifier different from its corresponding customer identifier. The data module is further configured to store the key map, and the key module is further configured to render each data set of the second group of data sets as unassociable with each data set of the first group of data sets by replacing, based on the key map, each unique customer identifier in the second group of data sets with the corresponding anonymous identifier. The rendering includes rendering each data set of the second group of data sets associable with each other data set of the second group of data sets based on the anonymous identifier.

In some embodiments, a method includes receiving a first data set including a customer identifier field, the customer identifier field specifying a unique customer identifier associated with each entry in the first data set. The method further includes storing the first data set and replacing each unique customer identifier of the first data set with a corresponding anonymous identifier based on a key map. The key map includes the customer identifier field and an anonymous identifier field. The customer identifier field for the key map includes the unique customer identifiers of the first data set, and the anonymous identifier field includes unique anonymous identifiers. Each anonymous identifier corresponds to a customer identifier of the key map, each anonymous identifier being different from its corresponding customer identifier.

BRIEF DESCRIPTION OF THE DRAWINGS

FIG. 3 is a flow chart illustrating another method, according to an embodiment.

FIG. 4 is a flow chart illustrating yet another method according to an embodiment.

DETAILED DESCRIPTION

Figure 1:
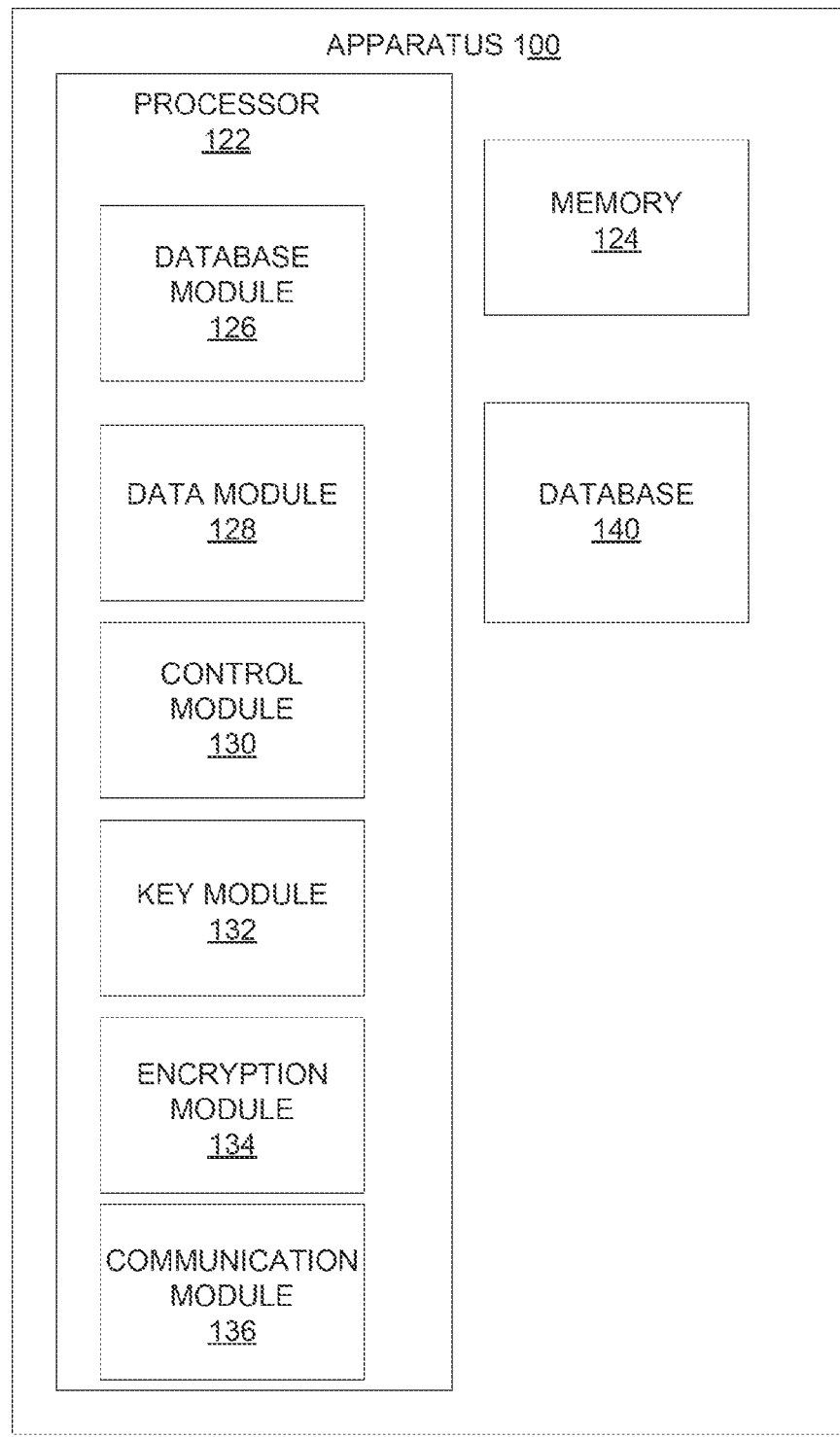
FIG. 1 is a block diagram of an apparatus, according to an embodiment.

In some embodiments, a method includes receiving a plurality of data sets. Each data set includes a customer identifier field that specifies a unique customer identifier associated with each entry in each data set. The plurality of data sets includes a first group of data sets and a second group of data sets, each data set associable with each other data set based on the customer identifier. The method further includes storing the plurality of data sets, and generating a key map including the customer identifier field and an anonymous identifier field. The customer identifier field for the key map includes unique customer identifiers of the first group of data sets of the plurality of data sets, and the anonymous identifier field includes unique anonymous identifiers. Each anonymous identifier corresponds to a customer identifier of the key map, each anonymous identifier different from its corresponding customer identifier. The method further includes storing the key map, and rendering each data set of the second group of data sets as unassociable with each data set of the first group of data sets by replacing, based on the key map, each unique customer identifier in the second group of data sets with the corresponding anonymous identifier. The method further includes rendering each data set of the second group of data sets associable with each other data set of the second group of data sets based on the anonymous identifier.

In some embodiments, the key map is stored in a different location than the plurality of data sets. In some embodiments, the method further includes deleting the key map. In some embodiments, the method further includes encrypting the key map with an encryption scheme such as, but not limited to, one of the following: a public-key encryption scheme and a symmetric key encryption scheme. In some embodiments, the first group of data sets includes demographic information for a plurality of households, and the second group of data sets includes transaction information for the plurality of households.

In some embodiments, a method includes receiving a reference data set including a customer identifier field. The customer identifier field of the reference data set specifies a unique customer identifier associated with each entry in the reference data set. The method further includes receiving a first data set including the customer identifier field. The customer identifier field for the first data set specifies a unique customer identifier associated with each entry in the first data set, the first data set associable with the reference data set based on the customer identifier field. The method further includes storing the reference data set and the first data set. The method further includes rendering the first data set unassociable with the reference data set by replacing each unique customer identifier of the second data set with a corresponding anonymous identifier based on a key map. The key map includes the customer identifier field and an anonymous identifier field, the customer identifier field for the key map including the unique customer identifiers of the second data set, the anonymous identifier field including unique anonymous identifiers, each anonymous identifier corresponding to a customer identifier of the key map, each anonymous identifier different from its corresponding customer identifier. The method further includes receiving one or more additional data sets, each additional data set including the customer identifier field. The one or more additional data sets are associable with the reference data set based on the customer identifier field and unassociable with the first data set. The method further includes rendering the one or more additional data sets as unassociable with the reference data set by replacing each unique customer identifier in each additional data set with its corresponding anonymous identifier, based on the key map. The rendering includes rendering the one or more additional data sets as associable with the first data set based on the anonymous identifier field.

In some embodiments, the reference data set includes demographic information for a plurality of households, and at least one of the first data set and the additional data sets includes transaction information for the plurality of households.

In some embodiments, an apparatus includes a data module configured to receive a plurality of data sets, each data set including a customer identifier field. The customer identifier field specifies a unique customer identifier associated with each entry in each data set. The plurality of data sets includes a first group of data sets and a second group of data sets, each data set associable with each other data set based on the customer identifier. The data module is further configured to store the plurality of data sets. The apparatus further includes a key module configured to generate a key map including the customer identifier field and an anonymous identifier field. The customer identifier field for the key map includes unique customer identifiers of the first group of data sets of the plurality of data sets, and the anonymous identifier field includes unique anonymous identifiers. Each anonymous identifier corresponds to a customer identifier of the key map, each anonymous identifier different from its corresponding customer identifier. The data module is further configured to store the key map, and the key module is further configured to render each data set of the second group of data sets as unassociable with each data set of the first group of data sets by replacing, based on the key map, each unique customer identifier in the second group of data sets with the corresponding anonymous identifier. The rendering includes rendering each data set of the second group of data sets associable with each other data set of the second group of data sets based on the anonymous identifier.

In some embodiments, the data module is further configured to delete the key map. In some embodiments, the apparatus further includes an encryption module configured to encrypt the key map with an encryption scheme including, but not limited to, one of the following: a public-key encryption scheme and a symmetric key encryption scheme.

In some embodiments, a method includes receiving a first data set including a customer identifier field, the customer identifier field specifying a unique customer identifier associated with each entry in the first data set. The method further includes storing the first data set and replacing each unique customer identifier of the first data set with a corresponding anonymous identifier based on a key map. The key map includes the customer identifier field and an anonymous identifier field. The customer identifier field for the key map includes the unique customer identifiers of the first data set, and the anonymous identifier field includes unique anonymous identifiers. Each anonymous identifier corresponds to a customer identifier of the key map, each anonymous identifier being different from its corresponding customer identifier.

For ease of explanation of the embodiments described herein, applicants offer the following exemplary, non-limiting scenario. Consider a set of data tables ("data sets"), joined to and/or otherwise associable with one another by one or more key columns serving as identifier. Explained herein with reference to a single key column/identifier for simplicity, in an example, in data sets related to transaction information at the household level, a household identifier or HHID can also be the identifier for a table of the household's demographic data, a table of the household's transaction data, a table of the household's segment membership, and/or the like. Aspects of the disclosure are operable to "break the link", un-join, anonymize, and/or render unassociable, such sensitive information data sets to other datasets, such as other data sets containing household identification information, containing non-sensitive household information, and/or the like. In this example, this is accomplished by replacing the HHID with an anonymous identifier, and generating a key map that contains each distinct HHID and its corresponding anonymous identifier. In this manner, by virtue of the key map, aspects of the disclosure still allowing the data sets rendered unassociable to have correct referential integrity, as will be described in more detail herein. All data sets having the anonymous identifier will join and/or be associable to one another correctly, but can not be linked and/or be unassociable with any other data set still having the HHID, such as a reference data set.

Key maps can be considered to play a "gatekeeper" role for the data sets that have the anonymous identifier field. To add or update a data set that includes the anonymous identifier field, the appropriate key map must be employed. To restore a data set having the anonymous identifier field to its original HHID field, the appropriate key map must be employed. If the key map is deleted, the data sets with the anonymous identifier field are referentially isolated from the data sets with the HHID field, such that no data can be added or removed from the data sets with the anonymous identifier field with mere knowledge of the HHID identifiers alone. If access to the key map is restricted, such as by encryption via a split-key encryption scheme, the data sets with the anonymous identifier field are effectively, referentially isolated from the data sets with the HHID field for any entity that does not have access to the key map, and can require (in this example) mutual consent from holders of both keys of the split-key encryption scheme to accurately access and/or modify the data sets with the anonymous identifier field.

In some embodiments, the data sets with the anonymous identifier field can be created as follows. All data sets that need to be rendered unassociable with other data sets (but remain associable with each other) are scanned to make a list of all identifier fields (similar to the HHID field described above). For each HHID field, a key map is generated that can contain a random, non-repeating anonymous identifier corresponding to each distinct HHID. For each data set that needs to be rendered unassociable, the HHID is replaced with the corresponding anonymous identifier based on the key map.

As an example, consider a data set of 19 individuals that have a unique ID ("id" field) that identifies them in the database. See Table 1.

TABLE 1

| id | fname | lname | address | city | zip |
|---|---|---|---|---|---|
| 8661 | Kiona | Wright | 320-6324 Suspendisse Ave | Wanzele | 21518 |
| 360 | Jada | Wynn | P.O. Box 223, 4388 At, Ave | Cranbrook | 60205 |
| 7514 | Bell | Orr | Ap #226-3919 Sit Av. | Grandrieu | 48443 |
| 2458 | Genevieve | Lester | 290-6627 Sapien. Road | Santa Caterina Villarmosa | 42285 |
| 4784 | Jessica | Levy | 3779 Nunc. Street | Pergola | N4V 3G1 |
| 2244 | Melvin | Howell | 483 Cras Av. | Macquenoise | 0538VQ |
| 9125 | Hayfa | Browning | 856-9645 Sem Ave | Vancouver | 8187 |
| 2600 | Tatyana | Frost | P.O. Box 338, 6298 Consectetuer Ave | Compiegne | 55068 |
| 3443 | Unity | Ross | 2398 Quis Ave | Langenburg | 44477 |
| 1378 | Thomas | Ware | P.O. Box 437, 9238 Sagittis Road | Burnie | Xxxx |
| 7930 | Jolene | Wiley | Ap #544-1568 Eu Avenue | Pietrain | 5195 |
| 5991 | Hector | Waters | P.O. Box 347, 636 Eleifend St. | Uppingham. Cottesmore | 48201 |
| 2658 | Katell | Delgado | 6024 Nonummy St. | Southaven | 5790 |
| 8909 | Elmo | Mercado | 9278 Molestie Rd. | San Francisco | 3423 |
| 5422 | Keith | Snider | 6154 Eu, Ave | Nieuwmunster | 9289 |
| 3784 | Nelle | Day | 9411 Accumsan Av. | Ussassai | T1L 3R2 |
| 1491 | Hamish | Carr | P.O. Box 617, 7601 Nulla Ave | Colorado Springs | 91989 |
| 3105 | Michael | Bates | 560-4259 Rhoncus Av. | Nemi | W3 2WN |
| 1368 | Nash | Lambert | Ap #628-1501 Amet, Road | Raymond | 1209AD |

Now consider two additional data sets that employ the same "id" field as Table 1; Table 2, which lists online page views, and Table 3, which lists sales information.

TABLE 2

| id | numberOfWebImpressions |
|---|---|
| 8661 | 187 |
| 360 | 114 |
| 7514 | 22 |
| 2458 | 176 |
| 4784 | 155 |

TABLE 2-continued

| id | numberOfWebImpressions |
|---|---|
| 2244 | 140 |
| 9125 | 28 |
| 2600 | 176 |
| 3443 | 115 |
| 1378 | 200 |
| 7930 | 129 |
| 5991 | 47 |
| 2658 | 68 |
| 8909 | 12 |
| 5422 | 139 |
| 3784 | 118 |
| 1491 | 194 |
| 3105 | 85 |
| 1368 | 18 |

TABLE 3

| id | totalSales |
|---|---|
| 8661 | $99.00 |
| 360 | $166.00 |
| 7514 | $102.00 |
| 2458 | $14.00 |
| 4784 | $85.00 |
| 2244 | $189.00 |
| 9125 | $169.00 |
| 2600 | $131.00 |
| 3443 | $186.00 |
| 1378 | $64.00 |
| 7930 | $22.00 |
| 5991 | $92.00 |
| 2658 | $123.00 |
| 8909 | $195.00 |
| 5422 | $95.00 |
| 3784 | $7.00 |
| 1491 | $24.00 |
| 3105 | $3.00 |
| 1368 | $48.00 |

In the current form of Tables 1-3, one could discover that ID 8661 belonged to Kiona Wright and that she had 187 web impressions and $99 in sales. Creating a key map that maps the "id" values to unique anonymous ID values prevent this association. One example for the key map could be as seen in Table 4, where the "anon_id" column corresponds to the anonymous ID values.

TABLE 4

| id | anon_id |
|---|---|
| 8661 | 53944 |
| 360 | 89885 |
| 7514 | 82459 |
| 2458 | 352 |
| 4784 | 49540 |
| 2244 | 85370 |
| 9125 | 54719 |
| 2600 | 95324 |
| 3443 | 68596 |
| 1378 | 68953 |
| 7930 | 87587 |
| 5991 | 8724 |
| 2658 | 28934 |
| 8909 | 21529 |
| 5422 | 85877 |
| 3784 | 76751 |
| 1491 | 31013 |
| 3105 | 15316 |
| 1368 | 95764 |

Once the key map has been generated, Tables 2-3 can be anonymized and/or otherwise rendered unassociable with Table 1. The modified version of Tables 2, 3 are seen in Tables 5, 6, respectively:

TABLE 5

| anon_id | numberOfWebImpressions |
|---|---|
| 53944 | 187 |
| 89885 | 114 |
| 82459 | 22 |
| 352 | 176 |
| 49540 | 155 |
| 85370 | 140 |
| 54719 | 28 |
| 95324 | 176 |
| 68596 | 115 |
| 68953 | 200 |
| 87587 | 129 |
| 8724 | 47 |
| 28934 | 68 |
| 21529 | 12 |
| 85877 | 139 |
| 76751 | 118 |
| 31013 | 194 |
| 15316 | 85 |
| 95764 | 18 |

TABLE 6

| anon_id | totalSales |
|---|---|
| 53944 | $99.00 |
| 89885 | $166.00 |
| 82459 | $102.00 |
| 352 | $14.00 |
| 49540 | $85.00 |
| 85370 | $189.00 |
| 54719 | $169.00 |
| 95324 | $131.00 |
| 68596 | $186.00 |
| 68953 | $64.00 |
| 87587 | $22.00 |
| 8724 | $92.00 |
| 28934 | $123.00 |
| 21529 | $195.00 |
| 85877 | $95.00 |
| 76751 | $7.00 |
| 31013 | $24.00 |
| 15316 | $3.00 |
| 95764 | $48.00 |

Impression and sales analysis can be run on the tables 5-6, which cannot be associated with table 1 without the use of the key map (table 4). In this manner, all of the data in tables 5-6 is still associable across these tables, and is further associable with other tables having the "anon_id" field for analysis. For example one can observe that anon_id 95764 had 18 web impressions and $48 of sales. If the key map is deleted, there is no way to associate such information back to the corresponding id in table 1 (Nash Lambert). Further, to update the sales value for in table 6 for Nash Lambert from $48 to $88, the key map (table 4) is required to determine that Nash Lambert corresponds to anon_id 95764, which in turn can be used to access table 6 and update the $48 value corresponding to anon_id 95764 to $88.

As used herein, a module can be, for example, any assembly and/or set of operatively-coupled electrical components, and can include, for example, a memory, a processor, electrical traces, optical connectors, software (executing in hardware), and/or the like. As used herein, the singular forms "a," "an" and "the" include plural referents unless the context clearly dictates otherwise. Thus, for example, the term "a database" is intended to mean a single database or a set of databases.

FIG. 1 is a schematic illustration of apparatus 100 within which aspects of the invention can be implemented, according to an embodiment. In some embodiments, the apparatus 100 is configured for data matching and anonymization, as described in more detail below. The apparatus 100 includes a processor 122 and a memory 124. The processor 122 includes at least a data module 128 and a key module 132. In some embodiments, the processor 122 includes an encryption module 134. The processor 122 can also include a communications module 136 for establishing and managing network connectivity of the apparatus 100, such as with, for example, one or more data sources (not shown) and/or a remote user (not shown) of the apparatus. The processor 122 can also include a control module 130 for manipulating aspects of the apparatus 100 and/or any of the other modules described here, such as by a local and/or remote user (not shown). It is to be understood that each of the modules may be in seamless communication with each other module.

The apparatus 100 can further include a database 140 distinct from the memory 224. In other embodiments, the memory 124 and the database 140 can be the same, and in yet another embodiment, the database 140 can be external to the apparatus 100. In some embodiments, a database module 126 of the processor 122 is employed to manipulate the database 140.

The apparatus 100 can be in communication with other entities, such as data sources and/or a remote user, via a network, which can be any type of network (e.g., a local area network or LAN, a wide area network or WAN, a virtual network, a telecommunications network, and/or the internet), implemented as a wired network and/or a wireless network. Any or all communications can be secured (e.g., encrypted) or unsecured, as is known in the art. The apparatus 100 can encompass a personal computer, a server, a database, a work station, a mobile device, a cloud computing environment, an application or a module running on any of these platforms, and/or the like.

In some embodiments, the database 140 and/or the memory 124 can hold data for purposes of data matching and anonymization, such as one or more data sets, including a reference set, a key map, and/or the like. In some embodiments, the data sets can include advertising data (e.g., see table 2) and/or transaction data (e.g., see table 3) for one or more promoted entities such as a product, at the household level. In some embodiments, the database 140 and/or the memory 124 can be populated with data sets for test groups and control groups in a manner similar to as described in related application Ser. No. 13/771,627 ("the '627 application") titled "SYSTEM AND METHOD FOR MEASURING ADVERTISING EFFECTIVENESS", filed on Feb. 20, 2013, the disclosure of which is incorporated herein by reference in its entirety.

In some embodiments, the data module 128 is configured to receive a plurality of data sets (e.g., similar to tables 1-3). The data sets can be any collection of related data in a structured format, such as, for example, a table consisting of one or more columns, and one or more rows. In some embodiments, each data set including an identifier field, such as, for example, the "id" column in tables 1-4. In some embodiments, the identifier field is a customer identifier field. In some embodiments, the customer identifier field specifies a unique customer identifier associated with each entry in each data set. Each data set is associable with each other data set based on the customer identifier field.

In some embodiments, the plurality of data sets including a first group of data sets and a second group of data sets. In some embodiments, the first group of data sets can include information that need not be anonymized with respect to the customer identifier field, while the second group of data sets includes information to be anonymized with respect to the customer identifier field. For example, in some embodiments, the first group of data sets includes demographic information for a plurality of households (e.g., see table 1), and second group of data sets includes transaction information for the plurality of households (e.g., see table 3).

The key module 132 is configured to generate a key map that includes the customer identifier field and an anonymous identifier field (e.g., see table 4). The customer identifier field for the key map includes unique customer identifiers of at least the first group of data sets, and in some embodiments, the entire plurality of data sets. In this manner, the key map can be selectively generated.

The anonymous identifier field of the key map (e.g., the "anon_id" column of table 4) includes unique anonymous identifiers, each anonymous identifier corresponding to a customer identifier of the key map. Each anonymous identifier is different from its corresponding customer identifier. In some embodiments, the key module 132 is configured to generate the anonymous identifiers of the key map in any suitable manner including, but not limited to, using a random string generator, as a non-repeating sequence of random numbers, replacement of one or more characters in the corresponding customer identifier, omission of one or more characters in the corresponding customer identifier, replacing the corresponding customer identifier with a generalized version (e.g., street name, or zip code, etc.), making random changes to one or more characters in the corresponding customer identifier, and/or the like. In some embodiments, a non-repeating sequence of random numbers is employed. In other embodiments, the database 140 and/or the memory 124 is configured to generate the anonymous identifiers in a manner similar to as described above.

Still describing the key module 132, in some embodiments, the key module further configured to replace, based on the key map, each unique customer identifier in the second group of data sets with the corresponding anonymous identifier. In this manner, the key module 132 renders each data set of the second group of data sets as unassociable with each data set of the first group of data sets, since the customer identifier is now absent from the second group of data sets but still present in the first group of data sets, while the anonymous identifier is now present in the second group of data sets but absent from the first group of data sets. Further, in this manner, the key module 132 renders each data set of the second group of data sets associable with each other data set of the second group of data sets based on the anonymous identifier. Said another way, the associability between the data sets of the second group is maintained.

Returning to the data module 128, the data module can be further configured to store the plurality of data sets, such as in the database 140 and/or the memory 124, directly or via the database module 126. The data module 128 can be further configured to store the key map. In some embodiments, the data module 128 is further configured to delete the key map. In some embodiments, the data module 128 is configured to store the key map in a different location than the plurality of data sets. For example, in some embodiments, the plurality of data sets is stored in the database 140 while the key map is stored in the memory 124, or vice versa. In other embodiments, the key map is stored in a different, external database (not shown), while the plurality of data sets is stored in the database 140.

Once the key map is generated and the second group of data sets is rendered unassociable with the first group of data sets, the data module 128, in some embodiments, is further configured to correlate a first entry in a first data set of the second group of data sets with a second entry in a second data set of the second group of data sets such as when, per the example earlier, transaction information need to be updated for a particular customer. The data module 128 can be configured to perform this by identifying, in the first data set, the anonymous identifier associated with the first entry, and identifying the second entry in the second data set corresponding to the identified anonymous identifier (i.e., based on the key map entry corresponding to the identified anonymous identifier). The data module 128 can be further configured to return the second entry in the second data set as correlated to the first entry in the first data set.

In some embodiments, the data module 128 can be configured to correlate, without employing the first group of data sets or the key map, a first entry in a first data set of the second group of data sets with a second entry in a second data set of the second group of data sets based on the anonymous identifier associated with the first entry. For example, for tables 5-6, it can be determined that the household with anon_id 95764 spent $48 and had a total web impression count of 18, without discerning the true identity of the household (Nash Lambert from table 1).

In some embodiments, the encryption module 134 is configured to encrypt the key map with an encryption scheme such as, but not limited to a public-key encryption scheme and a symmetric key encryption scheme. Any suitable digital protection technique can be employed that restricts access to the contents of the key map.

Figure 2:
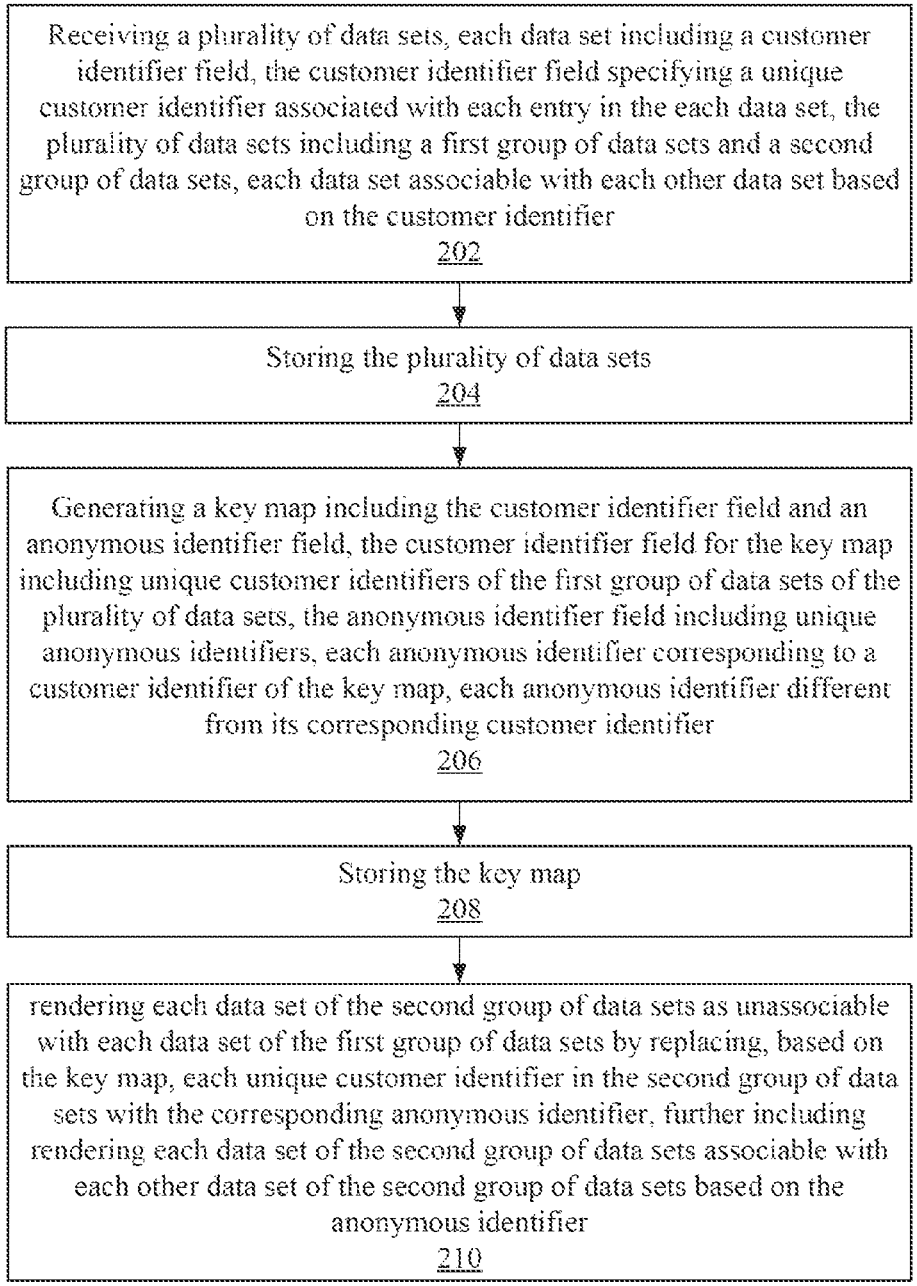
FIG. 2 is a flow chart illustrating a method, according to an embodiment.

FIG. 2 is a flow chart illustrating a method 200 according to an embodiment. In some embodiments, the method 200 is for data matching and anonymization using a key map. The method 200 can be performed by the apparatus 100, or any apparatus structurally/functionally similar to the apparatus 100. Particularly, instructions associated with performing the method 200 can be stored in a memory of the apparatus (e.g., the memory 124 of the apparatus 100 in FIG. 1) and executed in a processor of the apparatus (e.g., the processor 122 of the apparatus 100 in FIG. 1).

At 202, the processor 122 can be configured to receive a plurality of data sets (e.g., similar to tables 1-3), each data set including a customer identifier field. The customer identifier field specifies a unique customer identifier associated with each entry in each data set. The plurality of data sets includes a first group of data sets and a second group of data sets, each data set associable with each other data set based on the customer identifier. In some embodiments, the first group of data sets include demographic information (e.g., similar to table 1) for a plurality of households, and the second group of data sets includes transaction information (e.g., similar to table 3) for the plurality of households.

At 204, the processor 122 can be configured to store the plurality of data sets. At 206, the processor 122 can be configured to generate a key map (e.g., similar to table 4) including the customer identifier field and an anonymous identifier field. The customer identifier field for the key map includes unique customer identifiers of the first group of data sets of the plurality of data sets, and the anonymous identifier field includes unique anonymous identifiers. Each anonymous identifier corresponds to a customer identifier of the key map, and each anonymous identifier is different from its corresponding customer identifier.

At 208, the processor 122 can be configured to store the key map. In some embodiments, the key map is stored in a different location than the plurality of data sets.

At 210, the processor 122 can be configured to render each data set of the second group of data sets as unassociable with each data set of the first group of data sets by replacing, based on the key map, each unique customer identifier in the second group of data sets with the corresponding anonymous identifier. In this manner, the processor 122 renders each data set of the second group of data sets associable with each other data set of the second group of data sets based on the anonymous identifier.

In some embodiments, the method 200 further includes correlating, without employing the first group of data sets or the key map, a first entry in a first data set of the second group of data sets with a second entry in a second data set of the second group of data sets based on the anonymous identifier associated with the first entry.

In some embodiments, the method 200 further includes deleting the key map. In some embodiments, the method 200 further includes encrypting the key map with an encryption scheme selected from, but not limited to, the following: a public-key encryption scheme and a symmetric key encryption scheme.

FIG. 3 is a flow chart illustrating another method 300 according to an embodiment. In some embodiments, the method 300 is for data matching and anonymization using a key map. The method 300 can be performed by the apparatus 100, or any apparatus structurally/functionally similar to the apparatus 100. Particularly, instructions associated with performing the method 300 can be stored in a memory of the apparatus (e.g., the memory 124 of the apparatus 100 in FIG. 1) and executed in a processor of the apparatus (e.g., the processor 122 of the apparatus 100 in FIG. 1).

At 302, the processor 122 can be configured to receive a reference data set (e.g., similar to table 1) including a customer identifier field. The customer identifier field of the reference data set specifies a unique customer identifier associated with each entry in the reference data set.

At 304, the processor 122 can be configured to receive a first data set including the customer identifier field (e.g., table 2). The customer identifier field for the first data set specifying a unique customer identifier associated with each entry in the first data set, the first data set associable with the reference data set based on the customer identifier field.

At 306, the processor 122 can be configured to store the reference data set and the first data set. At 308, the processor 122 can be configured to render the first data set unassociable with the reference data set by replacing each unique customer identifier of the second data set with a corresponding anonymous identifier based on a key map. In some embodiments, the key map (e.g., similar to table 4) is stored in a different location than the reference data set and the first data set.

The key map includes the customer identifier field and an anonymous identifier field, with the customer identifier field for the key map including the unique customer identifiers of the second data set, and the anonymous identifier field including unique anonymous identifiers. Each anonymous identifier corresponds to a customer identifier of the key map, and each anonymous identifier different from its corresponding customer identifier.

At 308, the processor 122 can be configured to receive one or more additional data sets (e.g., table 3), each additional data set including the customer identifier field. The one or more additional data sets are associable with the reference data set based on the customer identifier field and are unassociable with the first data set.

At 310, the processor 122 can be configured to render the one or more additional data sets as unassociable with the reference data set by replacing each unique customer identifier in each additional data set with its corresponding anonymous identifier based on the key map. The rendering at step 310 includes rendering the one or more additional data sets as associable with the first data set based on the anonymous identifier field.

In some embodiments, the reference data set includes demographic information for a plurality of households, and at least one of the first data set and the additional data sets includes transaction information for the plurality of households.

In some embodiments, the method 300 further includes correlating a first entry in the reference data set with a second entry in the first data set by identifying, in the reference data set, the customer identifier associated with the first entry and identifying, in the key map, the anonymous identifier corresponding to the identified first identifier. In such embodiments, the method can further include identifying the second entry in the first data set corresponding to the identified anonymous identifier, and returning the second entry in the first data set as correlated to the first entry in the reference data set.

In some embodiments, the method 300 further includes encrypting the key map with an encryption scheme selected from, but not limited to, the following: a public-key encryption scheme and a symmetric key encryption scheme. In some embodiments, the method 300 further includes deleting the key map.

In some embodiments, the method 300 further includes correlating, without employing the reference data set or the key map, a first entry in the first data set with a second entry in one of the additional data sets based on the anonymous identifier associated with the first entry.

In some embodiments, the method 300 further includes generating the key map including the customer identifier field and the anonymous identifier field, and storing the key map in a different location than the reference data set, the first data sets, and the one or more additional data sets.

FIG. 4 is a flow chart illustrating another method 400 according to an embodiment. In some embodiments, the method 400 is for data matching and anonymization using a key map. The method 400 can be performed by the apparatus 100, or any apparatus structurally/functionally similar to the apparatus 100. Particularly, instructions associated with performing the method 400 can be stored in a memory of the apparatus (e.g., the memory 124 of the apparatus 100 in FIG. 1) and executed in a processor of the apparatus (e.g., the processor 122 of the apparatus 100 in FIG. 1)

At 402, the processor 122 can be configured to receive a first data set (e.g., similar to table 2) including a customer identifier field. The customer identifier field specifies a unique customer identifier associated with each entry in the first data set. At 404, the processor 122 can be configured to store the first data set.

At 406, the processor 122 can be configured to replace each unique customer identifier of the first data set with a corresponding anonymous identifier based on a key map (e.g., similar to table 4). The key map includes the customer identifier field and an anonymous identifier field. The customer identifier field for the key map includes the unique customer identifiers of the first data set and the anonymous identifier field includes unique anonymous identifiers. Each anonymous identifier corresponds to a customer identifier of the key map. Each anonymous identifier is different from its corresponding customer identifier.

At 408, the processor 122 can be configured to receive one or more additional data sets (e.g., similar to table 3). Each additional data set includes the customer identifier field, and the one or more additional data sets is unassociable with the first data set.

At 410, the processor 122 can be configured to render the one or more additional data sets associable with the first data set based on the anonymous identifier by replacing each unique customer identifier in each additional data set with its corresponding anonymous identifier, based on the key map.

Example 1

As another non-limiting example, consider two data sets (tables 7-8 below) that need to be anonymized and/or rendered unassociable with respect to a customer identifier. Table 7 contains exposure date information for consumers exposed to an online advertisement, and table 8 contains demographic segment information for the consumers.

TABLE 7

| hhid | exp_date |
|---|---|
| 123 | Apr. 1, 2013 |
| 456 | May 5, 2013 |

TABLE 8

| hhid | segment_name |
|---|---|
| 123 | Soccer_Mom |
| 123 | SUV_Owner |
| 456 | Video Gamer |

Aspects of the disclosure can determine that HHID column is a primary key (similar to the customer identifier), and generate a key map with a distinct, random value for each HHID, as shown in table 9:

TABLE 9

| hhid | anon_hhid |
|---|---|
| 123 | 20 |
| 456 | 40 |

If table 7 is identifiable as EXPOSURE, table 8 is identifiable as DEMO_SEGMENT, and table 9 is identifiable as HHID_KEYMAP, then it follows that tables 7, 8 can be rendered unassociable with other data sets employing the HHID identifiers '123' and '456', and rendered associable with other data sets employing the anonymized HHID identifiers '20' and '40', using the following exemplary code:

CREATE TABLE EXPOSURE_ANON
AS SELECT X.ANON_HHID AS HHID, E.EXP_DATE
FROM EXPOSURE E
JOIN HHID_KEYMAP X ON E.HHID=X.HHID;
CREATE TABLE DEMO_SEGMENT_ANON
AS SELECT X.ANON_HHID AS HHID, E.SEGMENT_NAME
FROM DEMO_SEGMENT E
JOIN HHID_KEYMAP X ON E.HHID=X.HHID;

The resulting anonymized tables, EXPOSURE_ANON (corresponding to Table 7) and DEMO_SEGMENT_ANON (corresponding to Table 8) are shown below as tables 10, 11 respectively.

TABLE 10

| hhid | exp_date |
|------|----------|
| 20 | Apr. 1, 2013 |
| 40 | May 5, 2013 |

TABLE 11

| hhid | segment_name |
|------|--------------|
| 20 | Soccer_Mom |
| 20 | SUV_Owner |
| 40 | Video Gamer |

In this manner, in some instances, the key map can be dynamically generated based on the received data sets without the need for a reference data set.

As described earlier, in some embodiments, the data sets may be associated with test and/or control groups for purposes of determining advertising effectiveness as described in the '627 application, in a manner that maintains user privacy (e.g., demographic information) while permitting sharing and/or dissemination of pertinent transactional, and other commercial information related to the campaign. For example, the data sets can include advertising data and transaction data for one or more promoted entities at the household level and/or for a specific retailer class such as, but not limited to, a mass channel population, an advertising campaign population, a drug channel population, a grocery channel population, a supercenter channel population, and/or the like.

In some embodiments, the advertising data set and transaction data set can include personally identifiable information (PII), which can be separated into a different data set of consumer data (e.g., such as table 1) followed by rendering the modified advertising data set and transaction data set unassociable with the consumer data set as described above. The consumer data set can include (but is not limited to) income, net worth, children indicators, a segment membership (e.g. lifestyle, buyer, etc.), spending information, one or more digital activity metrics, a household identifier (HHID) and/or the like. The modified advertising data set can include, among other things, information about date and time of exposure to the campaign (e.g. when exactly did the customer view the campaign advertisement), an identifier for the campaign, a HHID, an impression type and an impression identifier. The transaction data set can be product specific, and can also include a specification of a time associated with the transaction, a product identifier, the amount spent on the product, the retailer profile or source of the particular transaction for the product (e.g. a grocery channel), and a HHID. Embodiments described herein can generate a key map based on the HHID, and render the advertising data set, transaction data set unassociable with the consumer data set by replacing, in the advertising data set and transaction data set, the HHID with an anonymous HHID.

The processor 122 can be any suitable processor configured to run and/or execute the module(s) included in the processor 122. Each module in the processor 122 can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor 122) capable of performing one or more specific functions associated with that module. In some embodiments, the processor 122 can include other module(s) (not shown in FIG. 1) configured to perform other function(s) for the apparatus 100.

In some embodiments, the memory 124 can be, for example, a random-access memory (RAM) (e.g., a dynamic RAM, a static RAM), a flash memory, a removable memory, and/or so forth. In some embodiments, the memory 124 encompasses the database 140.

The methods described herein are examples of how to implement data matching and anonymization. It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. A method, comprising:
executing instructions in a memory and processor of at least one apparatus in order to perform the following steps:
receiving, by the processor, a reference data set including a customer identifier field and sensitive customer information, the customer identifier field of the reference data set specifying a respective customer identifier associated with each entry in the reference data set;
receiving, by the processor, a first data set including the customer identifier field, the customer identifier field for the first data set specifying a respective customer identifier associated with each entry in the first data set, the first data set associable with the reference data set based on customer identifiers in the customer identifier field;
storing, by the processor, the reference data set and the first data set;
rendering, by the processor, the first data set unassociable with the reference data set by replacing each respective customer identifier of the first data set with a corresponding anonymous identifier based on a key map, the key map including the customer identifier field and an anonymous identifier field, the customer identifier field for the key map including the respective customer identifiers of the first data set, the anonymous identifier field including anonymous identifiers, each respective anonymous identifier corresponding to a unique customer identifier of the key map, each respective anonymous identifier different from the corresponding unique customer identifier;
encrypting, by the processor, the key map with an encryption scheme;
receiving, by the processor, one or more additional data sets, each additional data set including the customer identifier field, the one or more additional data sets associable with the reference data set based on the customer identifier field and unassociable with the first data set;
rendering, by the processor, the one or more additional data sets as unassociable with the reference data set by replacing each unique customer identifier in each additional data set with the corresponding anonymous identifier, based on the key map, the rendering including rendering the one or more additional data sets as associable with the first data set based on the anonymous identifier field; and
executing, by the processor, an analytical query that correlates a first type of information in the one or more additional data sets with a different type of information in the first data set by matching anonymous identifiers in respective identifier fields in the first data set and the one or more additional data sets, wherein the first type of information comprises transaction information and the different type of information comprises advertising information, and wherein the correlated information is unassociable, by the analytical query, with the sensitive customer information in the reference data set.

2. The method of claim 1, wherein the key map is stored in a different location than the reference data set and the first data set.

3. The method of claim 1, further comprising:
correlating a first entry in the reference data set with a second entry in the first data set, including:
identifying, in the reference data set, the customer identifier associated with the first entry;
identifying, in the key map, the anonymous identifier corresponding to the customer identifier associated with the first entry;
identifying the second entry in the first data set corresponding to the identified anonymous identifier; and
returning the second entry in the first data set as correlated to the first entry in the reference data set.

4. The method of claim 1, further comprising:
wherein encrypting the key map is performed by selecting the encryption scheme from the following: a public-key encryption scheme and a symmetric key encryption scheme.

5. The method of claim 1, wherein the reference data set includes demographic information for a plurality of households, and at least one of the first data set and the additional data sets includes transaction information for the plurality of households.

6. The method of claim 1, further comprising:
correlating, without employing the reference data set or the key map, a first entry in the first data set with a second entry in one of the additional data sets based on the anonymous identifier associated with the first entry.

7. The method of claim 1, further comprising:
generating the key map including the customer identifier field and the anonymous identifier field; and
storing the key map in a different location than the reference data set, the first data sets, and the one or more additional data sets.

8. A system, comprising:
a memory and processor of at least one apparatus in which instructions are executed in order to perform the following steps:
receiving, by the processor, a reference data set including a customer identifier field and sensitive customer information, the customer identifier field of the reference data set specifying a respective customer identifier associated with each entry in the reference data set;
receiving, by the processor, a first data set including the customer identifier field, the customer identifier field for the first data set specifying a respective customer identifier associated with each entry in the first data set, the first data set associable with the reference data set based on customer identifiers in the customer identifier field;
storing, by the processor, the reference data set and the first data set;
rendering, by the processor, the first data set unassociable with the reference data set by replacing each respective customer identifier of the first data set with a corresponding anonymous identifier based on a key map, the key map including the customer identifier field and an anonymous identifier field, the customer identifier field for the key map including the respective customer identifiers of the first data set, the anonymous identifier field including anonymous identifiers, each respective anonymous identifier corresponding to a unique customer identifier of the key map, each respective anonymous identifier different from the corresponding unique customer identifier;
encrypting, by the processor, the key map with an encryption scheme;

receiving, by the processor, one or more additional data sets, each additional data set including the customer identifier field, the one or more additional data sets associable with the reference data set based on the customer identifier field and unassociable with the first data set;

rendering, by the processor, the one or more additional data sets as unassociable with the reference data set by replacing each unique customer identifier in each additional data set with the corresponding anonymous identifier, based on the key in map, the rendering including rendering the one or more additional data sets as associable with the first data set based on the anonymous identifier field; and executing, by the processor, an analytical query that correlates a first type of information in the one or more additional data sets with a different type of information in the first data set by matching anonymous identifiers in respective identifier fields in the first data set and the one or more additional data sets, wherein the first type of information comprises transaction information and the different type of information comprises advertising information, and wherein the correlated information is unassociable, by the analytical query, with the sensitive customer information in the reference data set.

9. A non-transitory computer-readable medium storing instructions which, when executed by one or more hardware processors, cause operations comprising:

receiving a reference data set including a customer identifier field and sensitive customer information, the customer identifier field of the reference data set specifying a respective customer identifier associated with each entry in the reference data set;

receiving a first data set including the customer identifier field, the customer identifier field for the first data set specifying a respective customer identifier associated with each entry in the first data set, the first data set associable with the reference data set based on customer identifiers in the customer identifier field;

storing, by the one or more processors, the reference data set and the first data set;

rendering the first data set unassociable with the reference data set by replacing each respective customer identifier of the first data set with a corresponding anonymous identifier based on a key map, the key map including the customer identifier field and an anonymous identifier field, the customer identifier field for the key map including the respective customer identifiers of the first data set, the anonymous identifier field including anonymous identifiers, each respective anonymous identifier corresponding to a unique customer identifier of the key map, each respective anonymous identifier different from the corresponding unique customer identifier;

encrypting the key map with an encryption scheme;

receiving one or more additional data sets, each additional data set including the customer identifier field, the one or more additional data sets associable with the reference data set based on the customer identifier field and unassociable with the first data set;

rendering the one or more additional data sets as unassociable with the reference data set by replacing each unique customer identifier in each additional data set with the corresponding anonymous identifier, based on the key map, the rendering including rendering the one or more additional data sets as associable with the first data set based on the anonymous identifier field; and executing an analytical query that correlates a first type of information in the one or more additional data sets with a different type of information in the first data set by matching anonymous identifiers in respective identifier fields in the first data set and the one or more additional data sets, wherein the first type of information comprises transaction information and the different type of information comprises advertising information, and wherein the correlated information is unassociable, by the analytical query, with the sensitive customer information in the reference data set.

10. The non-transitory computer-readable medium of claim 9, wherein the key map is stored in a different location than the reference data set and the first data set.

11. The non-transitory computer-readable medium of claim 9, wherein the instructions further cause operations comprising:

correlating a first entry in the reference data set with a second entry in the first data set, including:

identifying, in the reference data set, the customer identifier associated with the first entry;

identifying, in the key map, the anonymous identifier corresponding to the identified first identifier;

identifying the second entry in the first data set corresponding to the identified anonymous identifier; and returning the second entry in the first data set as correlated to the first entry in the reference data set.

12. The non-transitory computer-readable medium of claim 9, wherein encrypting of the key map is performed by selecting the encryption scheme from the following: a public-key encryption scheme and a symmetric key encryption scheme.

13. The non-transitory computer-readable medium of claim 9, wherein the reference data set includes demographic information for a plurality of households, and at least one of the first data set and the additional data sets includes transaction information for the plurality of households.

14. The non-transitory computer-readable medium of claim 9, wherein the instructions further cause operations comprising:

correlating, without employing the reference data set or the key map, a first entry in the first data set with a second entry in one of the additional data sets based on the anonymous identifier associated with the first entry.

15. The non-transitory computer-readable medium of claim 9, wherein the instructions further cause operations comprising:

generating the key map including the customer identifier field and the anonymous identifier field; and storing the key map in a different location than the reference data set, the first data sets, and the one or more additional data sets.

* * * * *